(12) United States Patent
Piccolo, III

(10) Patent No.: US 10,297,129 B2
(45) Date of Patent: May 21, 2019

(54) FIRE/SECURITY SERVICE SYSTEM WITH AUGMENTED REALITY

(71) Applicant: Tyco Fire & Security GmbH, Neuhausen am Rheinfall (CH)

(72) Inventor: Joseph Piccolo, III, Fitzwilliam, NH (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/863,674

(22) Filed: Sep. 24, 2015

(65) Prior Publication Data

US 2017/0091998 A1 Mar. 30, 2017

(51) Int. Cl.
| | |
|---|---|
| *G06F 3/147* | (2006.01) |
| *G08B 13/00* | (2006.01) |
| *G08B 17/10* | (2006.01) |
| *G08B 29/12* | (2006.01) |
| *G06T 19/00* | (2011.01) |
| *G06Q 10/00* | (2012.01) |

(52) U.S. Cl.
CPC ............ *G08B 17/10* (2013.01); *G06F 3/147* (2013.01); *G06Q 10/00* (2013.01); *G08B 13/00* (2013.01); *G08B 29/12* (2013.01); *G09G 2340/12* (2013.01)

(58) Field of Classification Search
CPC ........ G08B 17/10; G08B 13/00; G08B 29/12; G09G 2340/12; G06F 3/147; G06F 3/04847; G06F 3/04842; G06Q 10/00; G06T 19/006
USPC ....... 345/629, 633–634, 7, 8, 418; 703/1–28
See application file for complete search history.

(56) References Cited

U.S. PATENT DOCUMENTS

| | | | |
|---|---|---|---|
| 2013/0031202 A1* | 1/2013 | Mick | G06Q 10/06 345/629 |
| 2013/0053063 A1* | 2/2013 | McSheffrey | G08B 7/066 345/633 |
| 2013/0169681 A1* | 7/2013 | Rasane | G06T 19/006 345/633 |
| 2014/0210856 A1* | 7/2014 | Finn | G01C 15/002 345/633 |
| 2015/0302650 A1* | 10/2015 | Abdelmoati | G06F 3/041 345/633 |
| 2015/0325047 A1* | 11/2015 | Conner | G06T 19/006 345/633 |
| 2015/0327010 A1* | 11/2015 | Gottschalk | G06F 17/50 455/456.1 |
| 2016/0071319 A1* | 3/2016 | Fallon | G06T 19/006 345/633 |

(Continued)

FOREIGN PATENT DOCUMENTS

KR 101409964 B1 * 6/2014

*Primary Examiner* — Chante E Harrison
(74) *Attorney, Agent, or Firm* — HoustonHogle LLP

(57) ABSTRACT

An augmented reality system for use with security systems comprises an augmented reality engine that provides information concerning devices of a security system and a display device that combines the security system information from the augmented reality engine onto a representation or view of the surrounding physical, real-world environment. The system can be used for inspection, installation and/or servicing, for example. In application, it can be used to facilitate inspection including periodic testing to ensure that a fire detection and alarm system, for example, is in compliance with building and safety codes.

24 Claims, 5 Drawing Sheets

(56) References Cited

U.S. PATENT DOCUMENTS

| | | | |
|---|---|---|---|
| 2016/0140868 A1* | 5/2016 | Lovett | G06T 19/006 345/633 |
| 2017/0076504 A1* | 3/2017 | Oar | G02B 27/017 |
| 2017/0168566 A1* | 6/2017 | Osterhout | G06F 3/014 |

* cited by examiner

FIRE/SECURITY SERVICE SYSTEM WITH AUGMENTED REALITY

BACKGROUND OF THE INVENTION

Fire alarm systems, and more generally security systems, are often installed within buildings such as commercial, residential, or governmental buildings. Examples of these buildings include offices, hospitals, warehouses, schools, shopping malls, government offices, and casinos. The security systems typically include fire and/or security control systems (such as control panels), fire detection devices, alarm notification devices, surveillance cameras, access controllers, network video recorders, and door controllers, to list a few examples, which are installed throughout the buildings. Some examples of fire detection devices include smoke detectors, carbon monoxide detectors, flame detectors, temperature sensors, and/or pull stations (also known as manual call points). Some examples of alarm notification devices include speakers, horns, bells, chimes, light emitting diode (LED) reader boards, annunciator panels, and/or flashing lights (e.g., strobes).

The fire detection devices monitor the buildings for indicators of fire. Upon detection of an indicator of fire, the devices are activated and signals are sent from the activated device(s) to the control system, e.g., control panel. The control system then initiates an alarm condition by activating audio and visible alarms of the alarm notification devices of the fire alarm system. Additionally, the control system may also send a signal to a fire department or fire brigade, a central receiving station, local monitoring stations, and/or other building alarm/notification systems (e.g., public address systems).

In the case of more general security systems, the control system additionally interfaces with the surveillance cameras, network video recorders, video analytics systems, motion detectors, access control systems and other controllers. For example, these control systems may store and analyze camera video, check credentials of individuals at access points, and monitor other building systems.

Typically, building codes, local laws, standards, and/or insurance providers require that the fire detection and alarm annunciation devices are periodically tested (e.g., monthly, quarterly, or annually) to verify that the fire detection and alarm notification devices are physically sound, unaltered, working properly, and located in their assigned locations. This testing of the fire detection and alarm notification devices is often accomplished with a walkthrough test.

Additionally, these security systems need to be serviced and are often later reconfigured and upgraded. During the initial installation, the components must be installed and then interconnected. Later maintenance and upgrades may be required. Repair of the components or the control system also are not unusual.

Service systems for the inspection of security systems exist. For example, in walkthrough tests of fire alarm systems, a service system data logger is often connected to the fire control panel. The first technician then walks through the building and manually activates each fire detection and alarm notification device while the second technician remains at the control panel to verify that the fire panel received a signal from the activated device and the test was properly logged.

More recently, these service systems have taken the form of computers that are connected to the fire panels, which can avoid the need for the second technician. During the walkthrough test, the technician places one of the fire detection devices into an alarm condition. The fire panel detects the alarm condition of the activated device and sends a message containing the location and/or address of the activated device to the computer. Next, the computer converts the message received from the fire control panel to an audio stream and sends the audio stream to the technician over a communications link. The technician hears the location and/or address of the activated device and verifies if the device is wired correctly. The testing process repeats with the next fire detection device until the fire alarm system has been verified.

SUMMARY OF THE INVENTION

In many situations, it is important to improve the technicians' productivity in connection with inspection, installation and/or servicing of security systems, including fire detection and alarm systems. An emerging technology concerns augmented reality in which information is added to a representation or view of the surrounding physical, real-world environment.

In general, the present system concerns an augmented reality system for use with security systems. It can be used for inspection, installation and/or servicing, for example. In one application, it can be used to facilitate operational testing to ensure that the security system is operating according to its specifications. In a more specific example, this inspection can include periodic testing to ensure that a fire detection and alarm system, for example, is in compliance with building and safety codes.

In general, according to one aspect, the invention features an augmented reality system for use with security systems. The system comprises an augmented reality engine that provides information concerning devices of a security system and a display device that combines the security system information from the augmented reality engine onto a representation or view of the surrounding physical, real-world environment.

Preferably a portable (computer) system is included that receives the security system information from the augmented reality engine and forwards the security system information to the display device. The portable system can determine a position and/or orientation of the display device and a view through the display device and select security system information for display on the display device.

In embodiments, the security system information displayed on the display device includes information concerning the security system devices, such as smoke detectors, surveillance cameras, door controllers, control panels, and/or fire alarm control units.

Further, the security system information displayed on the display device can include directions to the security system devices and/or manuals for the security system devices. Live event data from the security system devices can also be provided as overlay information, for example, on the display device.

In general, according to one aspect, the invention features a security system inspection, installation and/or servicing method. This method comprises providing information concerning devices of a security system and combining the security system information onto a view of the surrounding physical, real-world environment.

In general, according to another aspect, the invention features a display device for an augmented reality system for use with security systems. The device combines security system information onto a representation or view of the surrounding physical, real-world environment including the security system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

In general, the present system concerns an augmented reality system for use with security systems. It can be used for inspection to facilitate operational testing to ensure that the security system is operating according to its specifications. In a more specific example, this inspection can include periodic testing to ensure that a fire detection and alarm system is in compliance with building and safety codes. In other examples, the system can be used for installation and/or servicing.

Augmented reality generally refers to a direct or indirect view of, in this case, the security system in which the components or devices associated with that security system are augmented with computer-generated graphics, data or possibly sound. This creates a modified reality for the operator in which the view of the security system is augmented with information concerning that security system. This augmentation typically happens in real time and is presented as data, including text data that is overlaid on top of an image or representation of the security system that could be either a direct view, a video of the security system, or a schematic representation of the security system.

Figure 1:
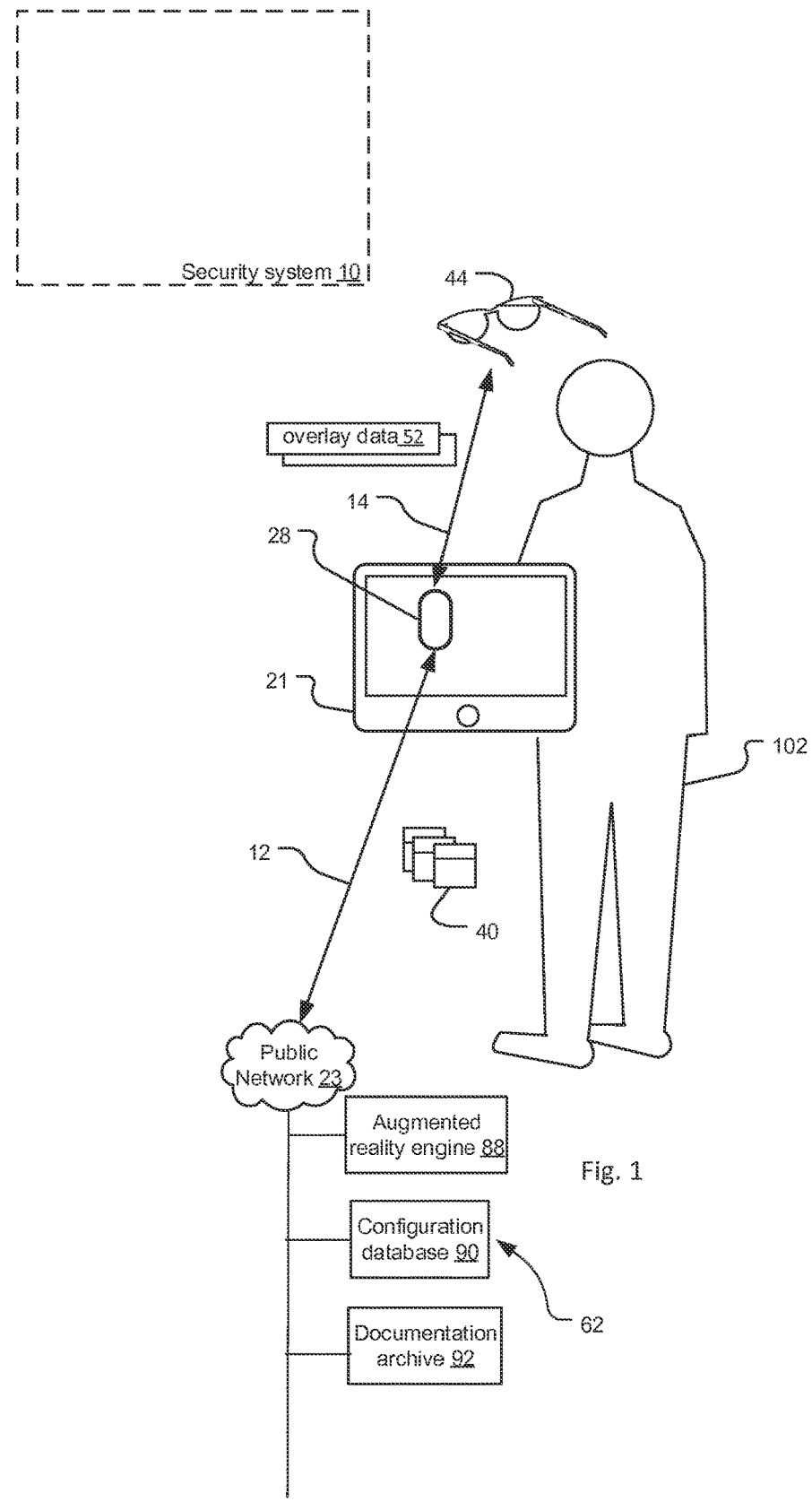
FIG. 1 is a schematic view showing an augmented reality system for the inspection, service and/or installation of a security system, such as a fire detection and alarm system, according to the present invention.

FIG. 1 schematically illustrates the components of the augmented reality system 10, which has been constructed according to the principles of the present invention.

A display device 44 is worn or otherwise operated by the operator 102 in the illustrated embodiment. The operator 102 can be an inspector, installer, or servicer of the security system 10.

The display device 44 can take a number of different forms in different embodiments. In one example, this display device 44 can be in the form of see-through glasses that further comprises a projection system for projecting information into the visual field of the operator 102. In other examples, the display device 44 can be a portable computer system with a video camera. In this case, the real time video captured by the camera is displayed on the display of the portable computer system. On top of this real time video display, information concerning the security system is overlaid. In still other examples, the display device 44 could be virtual reality goggles including a camera for collecting real time video from the surrounding environment and specifically the security system 10. Such devices typically have position and orientation tracking sensors to detect the movement and orientation of the operator.

In the illustrated example, the display device 44 works in conjunction with a portable system 21. In one example, this portable system is a portable computer such as a Windows or IOS operating system based computer. The portable computing device can be a mobile computing device or a smart phone mobile computing device.

The portable system 21 executes an application program 28 on the operating system, both of which are executed by a central processing unit of the portable system 21. This application program 28 feeds overlay data 52 to the display device 44.

In one example, the portable system 21 is integrated with the display device to form a single physical unit. In other examples, however, the portable system is a separate unit that communicates with the display device 44 such as through a wired or wireless link 14, for example a Bluetooth link.

In one example application, the operator 102 is at a site of a client or customer that is installing, has installed or operates the security system 10. The operator is at the site for inspection, installation and/or servicing of the security system 10. Particularly, the operator may be at the site to service the security system 10 or confirm its operation and compliance with building and/or safety codes. In a specific example, the security system is a fire detection and alarm type security system.

The augmented reality system 10 further includes system network components 62 such as an augmented reality engine 88. Additionally, the network components 62 typically include a configuration database 90 and possibly a document archive 92. A cellular data network and/or other wireless and wired networks including the internet 23 provide a data connection between the portable device 21 and the network components 62.

In other examples, however, the augmented reality engine 88 is integrated with the portable device 21 along with possibly the configuration database 90.

The position of the operator 102 and specifically the operator's view is typically determined by the display device 44, by itself or in combination with the portable system 21. For example, in some cases, the portable device 21 determines a location within the building for the operator, and the display device, possibly worn on the operator's head, determines an orientation and therefore a view in the building and of the security system, in one implementation.

This operator position, orientation and view information are used to access augmented reality information stored in the portable system and/or, via the data link 12, augmented reality information provided by the augmented reality engine 88. In one example, this connection can occur over public networks 23 or directly using wide area network connections as in the case of cellular data connections, in still other examples. The augmented reality engine 88 is typically installed on a remote network, such as a network operated by the manufacturer of the security system 10. In other examples, the remote network is located at an inspection company for security systems.

The augmented reality engine 88 provides information to the portable system 21 including the information that is included in the overlay data 52 provided on the display device 44. This information concerning the security system 10 is acquired by the augmented reality engine 88 by interrogating a configuration database 90. The configuration database 90 contains the information about the specific configuration of the security system 10 and the devices in the system. Typically, this security system information includes the types of devices that are installed in the security system 10 and the locations of the devices within the premise in which the security system 10 is installed. The security system information may further include prior inspection history and current status information of the devices of that security system 10.

The document archive 92 typically includes manuals and other information concerning the inspection, installation and/or servicing of the security system 10 and its devices.

Figure 2:
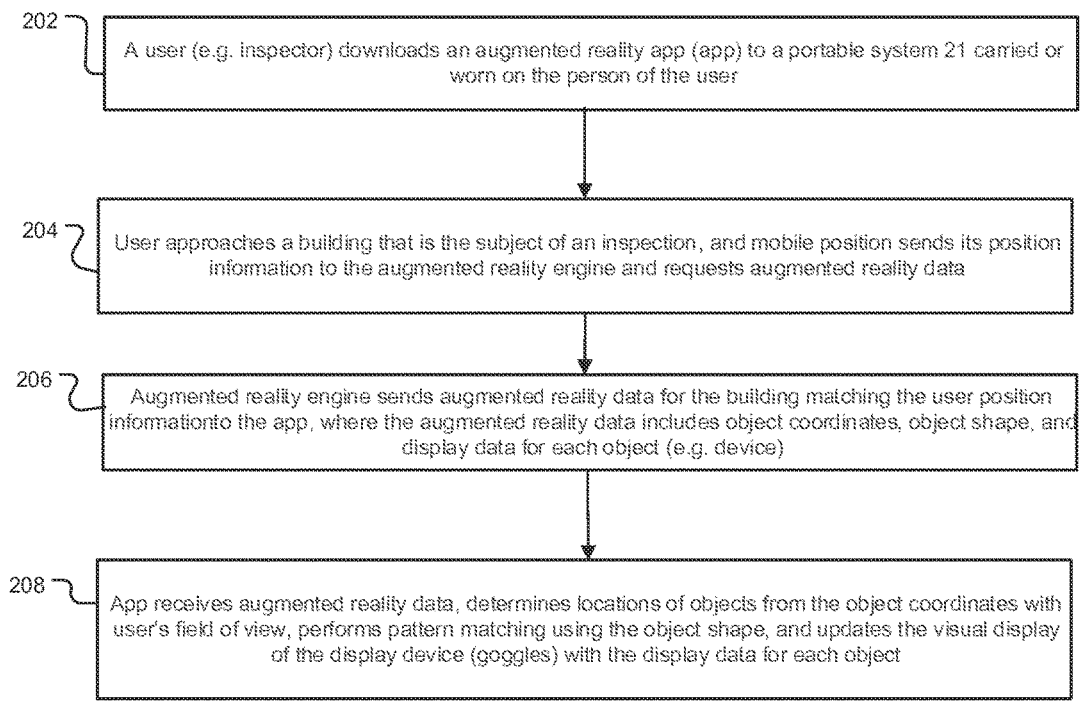
FIG. 2 is a flow diagram illustrating the operation of the augmented reality system.

FIG. 2 is a flow diagram illustrating how the augmented reality system is configured and then utilized.

First, in step 202, the operator 102 downloads the augmented reality app 28 on the portable system 21 and insures proper installation of that application program 28.

Then in step 204, as operator 102 approaches the premises, e.g., building, in which the security system 10 is installed, the portable system 21 or the portable system in conjunction with the display device 44 determine the operator's location 102 and forwards that information to the augmented reality engine 88, typically over the data network 23. The position information can be provided by the operator 102 or determined automatically via a positioning module within the portable system 21 that accesses a global positioning system (GPS) or other positioning system.

In step 206, the augmented reality engine 88 sends the augmented reality data to the portable system 21. In examples, this includes object/device coordinates, objects/device shapes and data to be displayed for each object or device. The portable system then converts this information into the overlay data 52 that is sent to the display device 44 and overlaid on top of the view, image or representation of the security system 10.

It should be noted, however, that the data can also be preloaded into the portable system 21.

In one implementation, as illustrated in step 208, the app 28 executing on the portable system 21 receives the augmented reality data and determines the locations of objects within the visual field of the operator 102. In one case, it receives video from a camera that captures the view of the operator. This camera is integrated in the display device 44 in one embodiment. The mobile device 44 and/or portable system 21 then performs pattern matching to identify the specific objects or devices of the security system 10 within the field of view of the operator 102. The visual display of the display device 44 is then updated with the overlay data 52 for the particular objects at which the operator 102 is looking.

Figure 3:
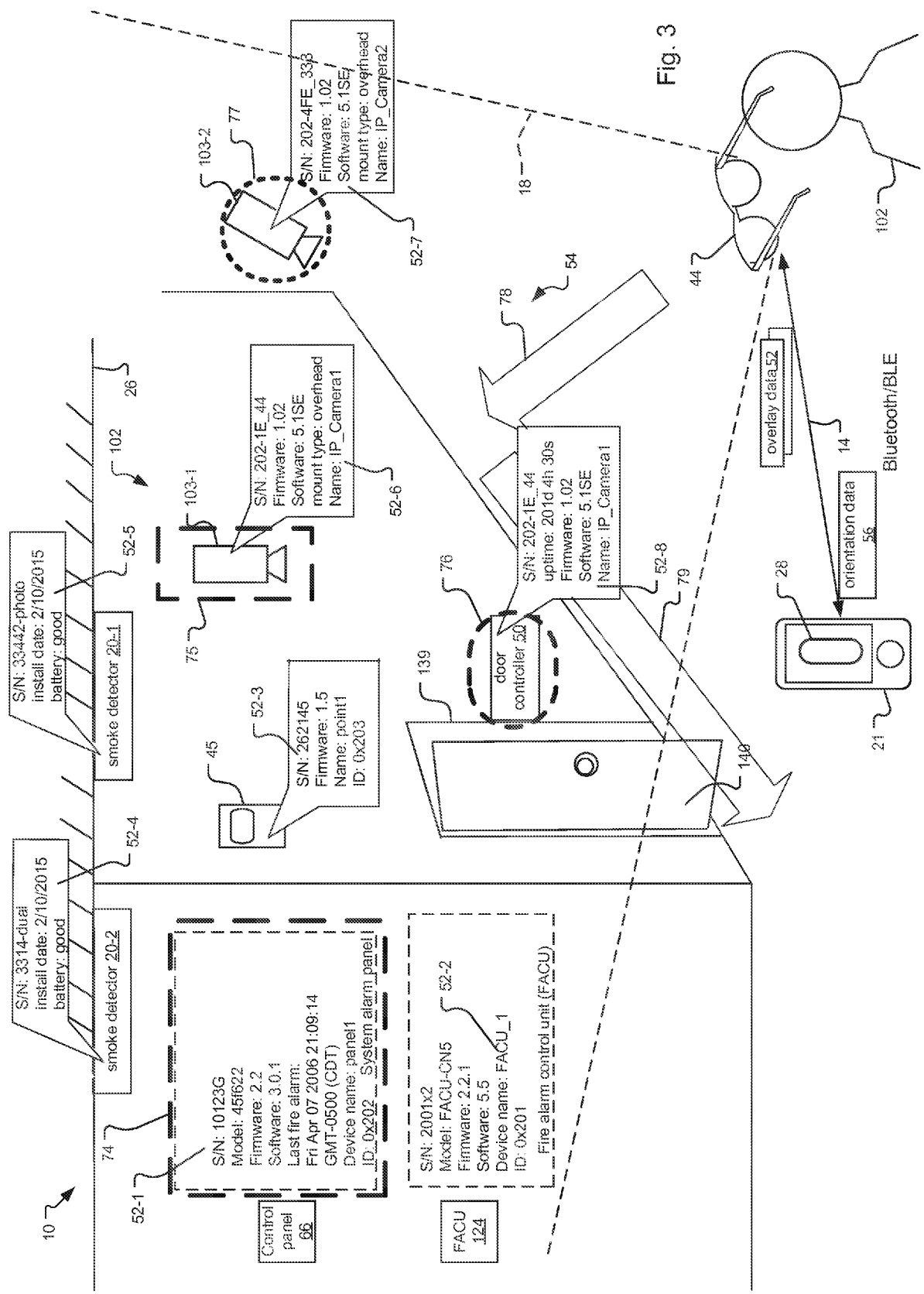
FIG. 3 is a schematic diagram of an augmented reality system showing the security system overlay information combined with a view of the surrounding physical, real-world environment.

FIG. 3 illustrates an exemplary view seen by the operator 102 of the security system 10. In the illustrated example, the operator 102 by observing and moving to observe various devices of the security system 10 installed within the building or premises. In the illustrated example, the operator observes a motion detector 45 and smoke detectors 20-1, 20-2. Also shown are exemplary surveillance cameras 103-1, 103-2 and a door controller 50.

Certain devices of the security system 10, such as the door controller 50 may not be directly observable. Door controllers 50 are often hidden in ceiling tiles or are relatively small components located in walls or above the controlled door 140. As result, they may be difficult to see. As result, in one example, the image of the door controller 50 or other device may be a schematic or synthetic representation of the door controller 50 that is projected onto the field of view of the operator by the display device 44.

Similar situations may also arise in the case of the control panel 66 and the fire alarm control unit 124. These devices may be located in a different room or a may be on the other side of a wall and not directly observable by the operator. Nevertheless, schematic representations of the control panel 66 or the fire alarm control unit 124 will be displayed as overlaid data by the display device 44 for the operator 102 in some implementations.

Overlaid information 52 for the various components of the security system 10 is further displayed for the operator 102 by the display device 44. The illustrated overlay information takes a number of different forms and is exemplary in nature showing the different types of overlay information 52 concerning the security system 10 that can be displayed.

For example, with respect to the control panel 66, the overlay data 52-1 includes information such as the serial number for the control panel 66, the specific model of the control panel 66, the firmware and software versions that are currently installed on control panel 66. Also, contemporaneous or historical event data are displayed in some cases. Here, the time of the last fire alarm is displayed in the operator's field of view adjacent the associated component (control panel 66) for the operator 102 by the display device 44. Also, the assigned name for the control panel is further displayed as overlay data 52-1 for the operator 102.

Similar information is also provided for the fire alarm control unit 124 in overlaid data 52-2. Here again, the name of the device, its serial number, its model and its firmware status are provided in the overlay data 52-2 projected by the display device 44.

For each of the other components or devices of the security system 10, specific information is displayed. For example, for the motion detector 45, surveillance cameras 103-1, 103-2, and the door controller 50, information including their respective serial numbers, their uptime operation, loaded firmware, and assigned name within the security system is provided as overlay information 52-3, 52-6, 52-7, and 52-8, respectively.

Similar information is provided for smoke detectors 20-1 and 20-2. There, the respective overlay information 52-5, 52-4 includes the serial number for the corresponding smoke detector, its install date, and the status of its battery. This battery status information can be obtained by the augmented reality engine 88 inquiring as to the status and reported battery state acquired by the control panel 66, in one case.

In another aspect, directions are provided for the operator 102. Specifically, schematic and synthetic arrows 78 and 79 are projected by the display device 44 within the field of view of the operator 102. These arrows provide a suggested path for the operator 102 to follow to perform the inspection and/or service of the security system.

For example, projected arrow 78 suggests or directs that the operator 102 first service the surveillance camera 103-1. In one example, this surveillance camera is highlighted by a projected synthetic overlay 75, which changes its color. In other examples, this synthetic overlay 75 is a blinking bar or other region surrounding or overlapping the security camera 103-1 and/or its overlay information 52-6. This guides the operator 102 to the surveillance camera 103-1 so that it can be serviced or reconfigured, for example. In another case, the highlighting overlay indicates a location at which the camera should be installed, when the operator is an installer.

For example, devices that need to be tested might be shown are highlighted with red or flashing symbols. On the other hand, devices that have been tested in past might be highlighted with green or surrounded by green boxes or other shapes.

In the illustrated example, then a second arrow 79 directs the operator 102 to move to the control panel 66. Here again, the control panel and in this case the overlay information 52-1 is surrounded by a highlighting projection 74, which guides the operator 102 and draws attention to the control panel 66, which is next on the list or schedule of devices to be serviced.

In still other examples, nonfunctioning devices can be further highlighted with preferably a blinking highlighting projection, for example. This is shown by the surrounding projected highlighting 77 for surveillance camera 103-2.

Figure 4A:
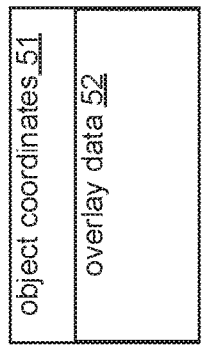
FIG. 4A is a schematic diagram showing security system overlay information from the augmented reality engine.

FIG. 4A illustrates the augmented reality information 41 that is provided by the augmented reality engine 88 to the portable system 21 and specifically the app 28 executing on the portable system 21. Typically, the information 41 includes the overlay data 52 which is the actual information to be displayed, such as projected, by the display device 44 for the operator. In one example, the information from the augmented reality server 88 further includes object or device coordinates 51. This allows the portable system 21 to determine the components of the security system 10 that are located within the current field of view and their specific location within the field of view of the operator 102. By performing this matching against the object coordinate information 51, the mobile device knows when and where to display the overlay data 52 within the field of view of the operator 102.

Figure 4B:
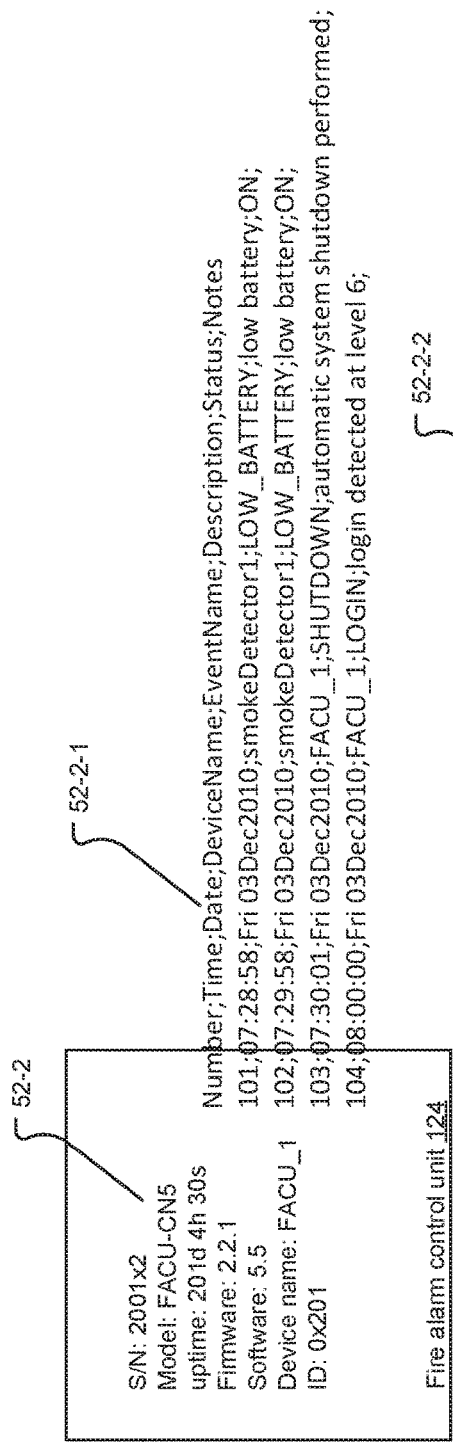
FIG. 4B is a schematic view showing security system overlay information including received real-time event data received by a fire panel.

FIG. 4B illustrates further examples of overlay data 52 that are displayed to the operator 102 when performing inspection, installation, and/or servicing of a specific component of the security system 10. In this example, the overlay data 52-2 for the fire alarm control unit 124 includes real time event data 52-2-1 that the unit 124 is receiving from devices, such as fire sensors, including smoke detectors and heat detectors that it communicates with over the data network of the security system 10.

Further illustrated are the instructions for the maintenance of the unit 124. These maintenance instructions are typically acquired from the document archive 92. In the illustrated example, the instructions 52-2-2 include the step-by-step instructions to be performed by the operator 102 to service the fire alarm control unit 124 which are displayed as overlay information.

Figure 5:
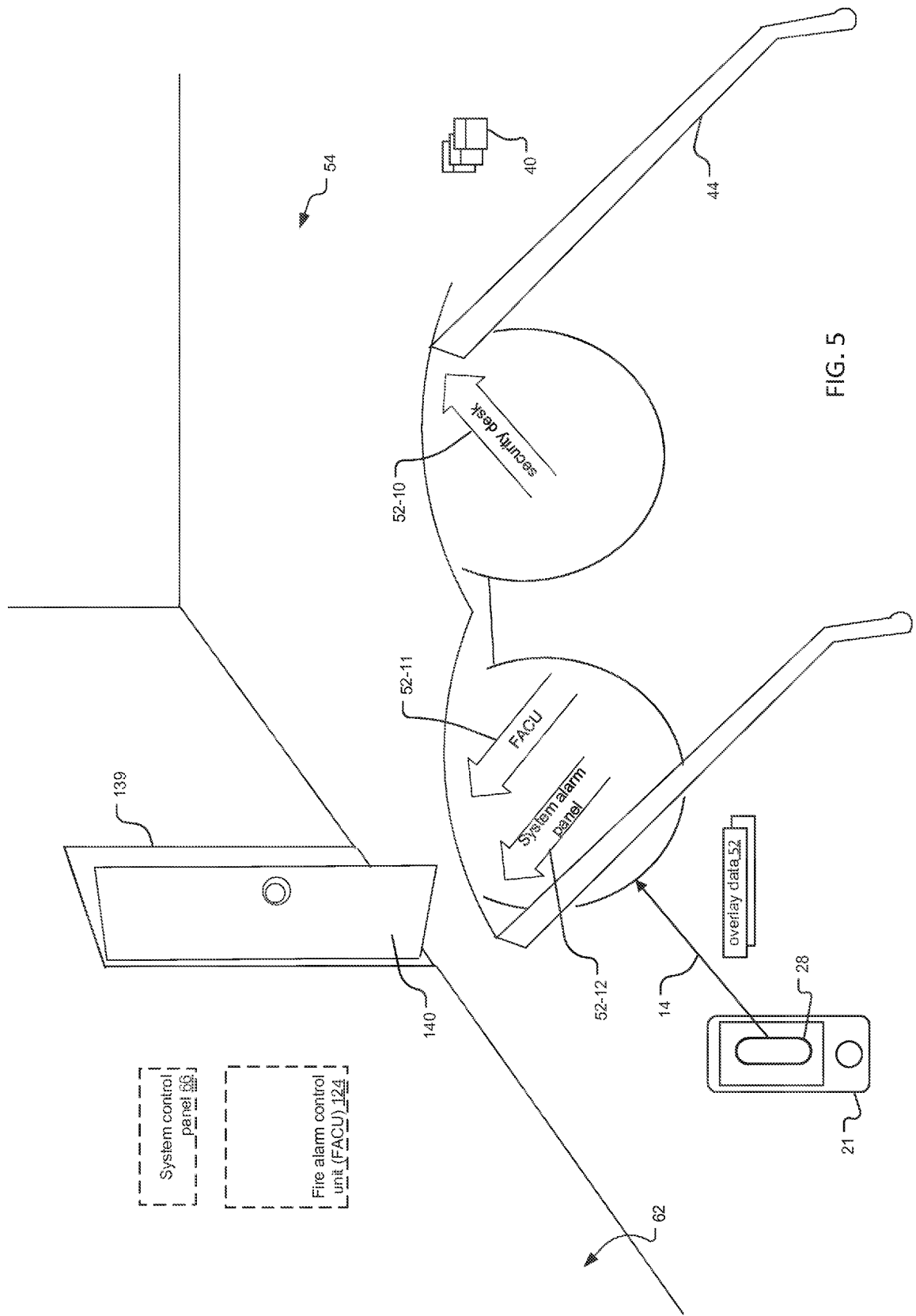
FIG. 5 is a schematic view of the augmented reality system showing the display of directions to security system devices and manuals for the security system devices.

FIG. 5 illustrates still other examples of overlay data 52 provided by the display device 44 to the operator 102. In this example, the overlay data from the portable system 21 includes directions in the form of a synthetically displayed arrow 52-10 that is displayed by the display device 44 for the operator indicating the direction to a security desk. On the other hand, arrow 52-11 identifies the direction to the fire alarm control unit 124, possibly in another room. Arrow 52-12 shows the direction to the system control panel. In this way, the overlay data 52 includes guidance in the specific step-by-step path for the operator or generation information.

In a further aspect manuals or other documentation 40 for the security system 10 are also projected into the field of view of the operator 102 when needed or when the operator turns their head to one side, for example.

While this invention has been particularly shown and described with references to preferred embodiments thereof, it will be understood by those skilled in the art that various changes in form and details may be made therein without departing from the scope of the invention encompassed by the appended claims.

What is claimed is:

1. An augmented reality system for use with fire detection and alarm systems of a building, the system comprising:
an augmented reality engine that provides information concerning devices of a fire detection and alarm system; and
a display device that combines the fire detection and alarm system information from the augmented reality engine onto a representation or view of the surrounding physical, real-world environment;
wherein the fire detection and alarm system information displayed on the display device includes: 1) directions to the fire detection and alarm system devices; 2) real time event data that is being received by fire alarm control units from fire sensors via a data network; and 3) overlay symbols indicating devices that need to be tested and different overlay symbols for devices that have been tested in the past.

2. The system as claimed in claim 1, further comprising a portable system that receives the fire detection and alarm system information from the augmented reality engine and forwards the fire detection and alarm system information to the display device.

3. The system as claimed in claim 2, wherein the portable system determines a position of the display device and a view through the display device and selects fire detection and alarm system information for display on the display device.

4. The system as claimed in claim 1, wherein the fire detection and alarm system devices are smoke detectors.

5. The system as claimed in claim 1, wherein the fire detection and alarm system devices are fire panels.

6. The system as claimed in claim 1, wherein the fire detection and alarm system information displayed on the display device includes manuals for the fire detection and alarm system devices.

7. The system as claimed in claim 1, wherein the fire detection and alarm system information displayed on the display device includes event data from the fire detection and alarm system devices.

8. The system as claimed in claim 1, wherein the information provided by the augmented reality engine includes prior inspection history for the devices; and the display device displays the prior inspection history for the devices.

9. The system as claimed in claim 1, further comprising a camera that captures images from a field of view of an operator and an operator system performing pattern matching on the images from the camera to identify specific devices of the fire detection and alarm system within the field of view of the operator, the display device displaying information for the specific devices for the operator.

10. The system as claimed in claim 1, wherein the display device displays indications of locations of devices of the fire detection and alarm system that are hidden from a view of an operator.

11. The system as claimed in claim 1, wherein the display device displays directions to an operator by displaying arrows indicating a suggested path through the building for the operator to follow to perform an inspection and/or service of the fire detection and alarm system.

12. The system as claimed in claim 1, wherein the directions are displayed by the display device projecting synthetic arrows within the field of view of an operator.

13. The system as claimed in claim 1, wherein the fire detection and alarm system information displayed on the display device includes schematic representations of devices that are hidden from a view of an operator.

14. A fire detection and alarm system inspection, installation and/or servicing method, comprising:
 providing information concerning devices of a fire detection and alarm system;
 receiving the fire detection and alarm system information from an augmented reality server and forwarding the fire detection and alarm system information to a display device;
 combining the fire detection and alarm system information onto a view of the surrounding physical, real-world environment using the display device;
 displaying the fire detection and alarm system information on the display device along with directions to the fire detection and alarm system devices;
 displaying real time event data that is being received by fire alarm control units from fire sensors via a data network; and
 displaying overlay symbols indicating devices that need to be tested and different overlay symbols for devices that have been tested in the past.

15. The method as claimed in claim 14, further comprising determining a position of the display device and a view through the display device and selecting fire detection and alarm system information for display on the display device based on the position and/or view.

16. The method as claimed in claim 14, wherein the fire detection and alarm system information includes information concerning the fire detection and alarm system devices.

17. The method as claimed in claim 14, wherein the fire detection and alarm system devices are smoke detectors.

18. The method as claimed in claim 14, wherein the fire detection and alarm system devices are fire panels.

19. The method as claimed in claim 14, wherein the fire detection and alarm system information displayed on the display device includes reference materials including manuals for the fire detection and alarm system devices.

20. The method as claimed in claim 14, wherein the fire detection and alarm system information displayed on the display device includes event data from the fire detection and alarm system devices.

21. The method as claimed in claim 14, further comprising:
 a camera capturing images from a field of view of an operator;
 performing pattern matching on the images to identify the specific devices of the fire detection and alarm system within a field of view of the operator; and
 displaying information for the specific devices for the operator.

22. The method as claimed in claim 14, wherein the directions are displayed by the display device by projecting synthetic arrows within a field of view of an operator.

23. An augmented reality system for use with fire detection and alarm systems of buildings, the system comprising:
 a camera that captures images from a field of view of an operator;
 an operator system performing pattern matching on the images from the camera to identify smoke detectors and fire panels of the fire detection and alarm system within the field of view of the operator;
 an augmented reality engine that provides contemporaneous or historical realtime event data concerning the smoke detectors and fire panels; and
 a display device that displays: 1) the contemporaneous or historical event data in overlays adjacent to the smoke detectors and fire panels in the images from the camera including displaying a time of a last fire alarm adjacent to the fire panel in the field of view of the operator; and 2) schematic representations of devices that are hidden from a view of the operator; 3) arrows that indicate a suggested path for the operator to follow to perform inspection and/or service of the fire detection and alarm systems; 4) real time event data that is being received by fire alarm control units from fire sensors via a data network; 5) overlay symbols indicating devices that need to be tested and different overlay symbols for devices that have been tested in the past; 6) model number information in overlays adjacent to the fire alarm control unit; and 7) battery state information in overlays adjacent to the smoke detectors.

24. The system as claimed in claim 23, wherein the display device displays device name information in overlays adjacent to the smoke detectors.

* * * * *